No. 688,987. Patented Dec. 17, 1901.
E. DÖNITZ.
OPTICAL INSTRUMENT FOR MEASURING THE DISTANCE BETWEEN THE EYES.
(Application filed July 25, 1901.)

(No Model.)

Carl Krüger
Jacob Heckel

Emil Dönitz

UNITED STATES PATENT OFFICE.

EMIL DÖNITZ, OF JENA, GERMANY, ASSIGNOR TO THE FIRM CARL ZEISS, OF JENA, GERMANY.

OPTICAL INSTRUMENT FOR MEASURING THE DISTANCE BETWEEN THE EYES.

SPECIFICATION forming part of Letters Patent No. 688,987, dated December 17, 1901.

Application filed July 25, 1901. Serial No. 69,701. (No model.)

*To all whom it may concern:*

Be it known that I, EMIL DÖNITZ, engineer, a subject of the Duke of Anhalt, residing at Carl Zeiss strasse, Jena, in the Grand Duchy of Saxe-Weimar, German Empire, have invented a new and useful Optical Instrument for Measuring the Distance Between the Eyes, of which the following is a specification.

The present invention consists in an optical instrument by means of which an optician may more exactly determine the distance between the pupils of his client's eyes than in any way hitherto known. In this instrument two mirrors and a scale are combined. One mirror reproduces the scale in proximity of the patient's pupils and in the plane of these pupils, so that the observer is prevented from any parallactic error when using both eyes in reading the position of the pupils relatively to the scale-image. The other mirror enables the patient to successively direct one and the other eye straight ahead by fixing both his eyes upon the image at first of one and then of the other eye, while the observer reads at the scale-image the position of the one and the other eye, respectively.

Figure 1:
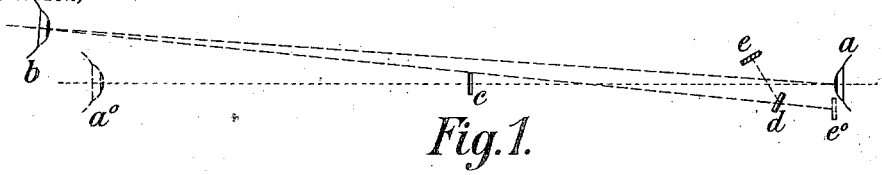
Figure 2:
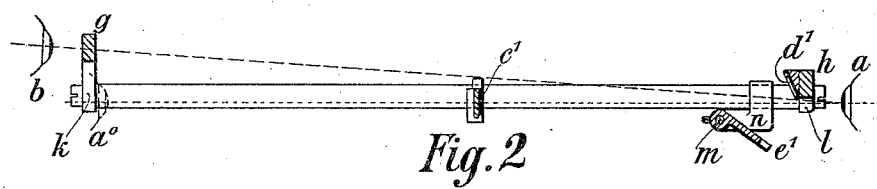
Figure 3:
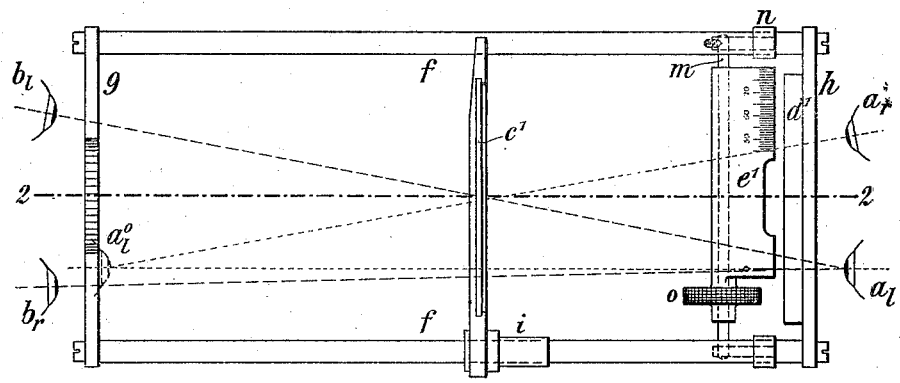
Figure 4:
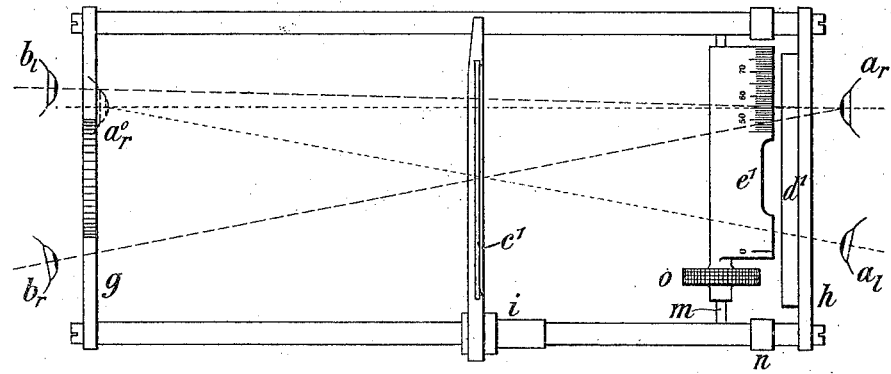

In the annexed drawings, Figure 1 is a diagram of a combination of a scale and two mirrors which is arranged according to the invention. Fig. 2 is a sectional elevation of an instrument constructed according to the invention. Fig. 3 is a plan view of the same instrument, showing the first stage of the operation. Fig. 4 is another plan view showing the second stage of the operation.

In the diagram shown in Fig. 1, $a$ represents the eyes the distance between which is to be measured, and $b$ represents the eyes of the observer. The eyes $a$ look into the mirror $c$ and perceive therein one or the other of their images $a^0$. The eyes $b$ look upon one or the other of the eyes $a$ and into the mirror $d$ and perceive therein an image $e^0$ of the scale $e$ at the same distance as the pupils of the eyes $a$. It will be understood that the position of the scale-image $e^0$ may be approached to the actual position of the eye $a$ by moving either the mirror $d$ or the scale $e$, or both of them.

A modified arrangement of mirror $d$ and scale $e$ has been employed in the instrument shown in Figs. 2 to 4. In this construction the mirror $d'$ is above and the scale $e'$ below the plane connecting the eyes $a$ and $b$; but it will be understood that mirror and scale might also be arranged both above as well as both below the said plane.

The frame of the instrument consists of two longitudinal rods $ff$ and two transversal bars $g$ and $h$. The mirror $c'$ is fastened on a sleeve $i$, by means of which it may be carried along on one of the rods $f$ for the purpose of approaching it to myopic eyes $a$ and removing it from hypermetropic eyes $a$. The transversal bar $g$ rests on the nose of the observer by means of its yoke $k$, Fig. 2, which is deep enough to allow the eyes $b$ of the observer to look above the lateral parts of bar $g$. The transversal bar $h$ carries a small nose-yoke $l$, Fig. 2, for the examinee. On a transversal rod $m$, secured in brackets $n$ of the longitudinal rods $f$, the scale $e'$ is loosely mounted, so that it may be rotated, as well as moved endwise, for which both purposes a disk-shaped handle $o$ is provided.

The operation is as follows: The observer puts the instrument by its yoke $l$ on the nose of the examinee so as to see the pupils of the examinee immediately below the mirror $d'$ and causes his own nose to enter the yoke $k$. Then while his left hand is holding the instrument by its left rod $f$, he turns the scale, seizing hold of its disk $o$ until the lower terminations of the graduation-lines of the scale-image, as seen by him in the mirror $d'$, enter the pupilar plane of the eyes $a$. Thereupon he causes the examinee to have both eyes $a_l$ and $a_r$ fixed upon the center of the image $a^0{}_l$ of his left eye $a_l$, Fig. 3, so as to give the eye $a_l$ the same direction as when both eyes look ahead into the distance. The observer himself directing both eyes $b_l$ and $b_r$ to the center of the pupil of the eye $a_l$, as shown in Fig. 3, moves the scale $e'$ endwise for the purpose of bringing the zero-line of the scale-image exactly above the said center. This done, he causes the examinee now to direct the eyes upon the center of the image $a^0{}_r$, Fig. 4, of his right eye $a_r$ and reads on the scale-image the position of the pupilar center of eye $a_r$. The value observed is the correct distance between the eyes of the examinee looking ahead into the distance.

What I claim as my invention, and desire to secure by Letters Patent, is—

1. The combination, with a scale longitudinally arranged on a horizontal bar, of two narrow mirrors extending parallelly to the scale-bar and so located relatively to the scale, that the first mirror produces an image of the scale, that the second mirror is situated in a direction from the first mirror contrary to that of the image, and that an eye in proximity of this image may see itself in the second mirror, and a frame connecting the scale-bar and both mirrors, essentially as described.

2. In an instrument for measuring the distance between both eyes the combination with a scale longitudinally arranged on a horizontal bar of two narrow mirrors extending parallelly to the scale-bar and so located relatively to the scale, that the first mirror produces an image of the scale and that the second mirror is situated in a direction from the first mirror contrary to that of the image and enables an eye which is in proximity of the said image to see itself therein, a frame connecting the scale-bar and both mirrors, and means for varying the position of the image so as to approach it to the actual position of the said eye, essentially as described.

In testimony whereof I have signed my name to this specification in the presence of two subscribing witnesses.

EMIL DÖNITZ.

Witnesses:
PAUL KRÜGER,
JACOB HECKEL.